United States Patent [19]

Ito et al.

[11] 4,293,787
[45] Oct. 6, 1981

[54] STATOR WINDING HOLDING STRUCTURE FOR ROTARY ELECTRIC MACHINE

[75] Inventors: Motoya Ito; Masaki Sato; Masatoshi Watanabe; Hironori Okuda, all of Hitachi, Japan

[73] Assignee: Hitachi, Ltd., Tokyo, Japan

[21] Appl. No.: 3,012

[22] Filed: Jan. 12, 1979

[30] Foreign Application Priority Data

Feb. 24, 1978 [JP] Japan ................................. 53/19697

[51] Int. Cl.$^3$ ............................................. H02K 1/00
[52] U.S. Cl. ................................. 310/181; 310/154; 310/214; 310/216; 310/270
[58] Field of Search ................... 310/179, 51, 45, 181, 310/214, 44, 254, 261, 152, 264, 265, 154, 260, 270, 258, 259, 216, 218; 336/197; 322/46; 335/229, 232, 233

[56] References Cited

U.S. PATENT DOCUMENTS

| | | |
|---|---|---|
| 871,758 | 11/1907 | Heitmann .......................... 310/214 |
| 888,456 | 5/1908 | Barr .................................. 310/214 |
| 984,182 | 2/1911 | Barr .................................. 310/214 |
| 2,015,554 | 9/1935 | Fisher ............................... 310/214 |
| 2,201,699 | 5/1940 | Myers ................................ 310/44 |
| 2,386,673 | 10/1945 | Fisher ............................... 310/214 |
| 2,710,931 | 6/1955 | Tittel ................................. 310/214 |
| 3,437,858 | 4/1969 | White ................................ 310/214 |
| 3,949,256 | 4/1976 | Cooper .............................. 310/260 |
| 3,950,665 | 4/1976 | Schneider ......................... 310/260 |
| 4,088,914 | 5/1978 | Aoki .................................. 310/264 |
| 4,134,290 | 3/1979 | Mizukami .......................... 310/270 |

Primary Examiner—R. Skudy
Attorney, Agent, or Firm—Craig and Antonelli

[57] ABSTRACT

A rotary electric machine comprises a rotor axially shorter than the lamination thickness of the stator core and having a coil retaining ring at each end of the coil thereof. The rotary electric machine further comprises a magnetic transmission device between each of the adjacent teeth of the stator core opposed to the coil retaining ring.

9 Claims, 10 Drawing Figures

MAGNETIC TRANSMISSION WEDGES 9

ORDINARY NON-MAGNETIC WEDGES 19 IN INTERMEDIATE SLOT BETWEEN SLOTS WITH WEDGES 9

SPECIFIC MAGNETIC PERMEABILITY OF MAGNETIC WEDGE

STATOR WINDING HOLDING STRUCTURE FOR ROTARY ELECTRIC MACHINE

The present invention relates to an improvement in rotary electric machines such as turbine generators and induction motors, or more in particular to an improvement in a rotary electric machine of the type which comprises a rotor having an axial length shorter than the lamination thickness of the stator core and having a coil retaining ring at each rotor coil end thereof.

As well known, the rotary electric machine of this type generally comprises a stator having an iron core and a coil winding, and a rotor rotatably supported within the stator and having a core and a coil winding. It has been the common practice that the cores of the rotor and the stator are rendered substantially equal to each other in axial length. It has been recently suggested, however, that the axial length of the rotor core be rendered somewhat shorter than that of the stator in order to reduce the eddy current loss at the axial ends of the stator core. Part of the eddy current loss at the ends of the stator core is attributable to the eddy current caused by leakage magnetic fluxes of the rotor rotated inside of the stator, which magnetic fluxes enter the ends of the stator core axially from outside thereof. If the axial length of the rotor core is rendered shorter than the axial length of the stator core as mentioned above, however, the ends of the stator core are widely spaced from the rotor coil generating the leakage magnetic fluxes, with the result that less leakage fluxes of the rotor enter the axial ends of the stator core, thus reducing the eddy current loss. The rotary electric machine thus configured is considered effective in preventing the loss in the stator core. The latest detailed experiments conducted by the inventors, however, show that such a configuration still has some disadvantages as described below.

In a rotor of the rotary electric machine, the winding coils thereof are mounted into slots and secured by wedges so that the coils are not removed from the slots by the centrifugal force caused by the rotation of the rotor. Further, a coil retaining ring of metal is fitted on each axial end of the winding to strengthen the security. For some types of rotary electric machines, the retaining ring is securely shrinkage-fitted on the end of the core. Therefore, if the rotor core is shorter than the stator core, the retaining rings are opposed to the surface of the inner peripheral wall of the stator core, so that the ripple magnetic fluxes by the stator slots affect the retaining rings undesirably. In other words, the slot ripple magnetic fluxes cause eddy currents in the surface of the retaining ring. The effects of the slot ripple magnetic fluxes are not always uniform over the entire surface of the retaining ring, thus causing a local loss, leading to a local overheating. As a result, the retaining ring may be deformed, thereby causing a dynamic imbalance in the rotor, which in turn contributes to vibrations. This problem may of course be solved by compensating for the dynamic imbalance. However, it is practically very difficult to solve it, in view of the fact that the vibrations are found only after the machine is placed in normal operation with the rotor and stator thereof assembled, and that even if the rotor alone is rotated and adjusted for dynamic balance with a balance weight or the like, it is impossible to correct the above-mentioned type of dynamic imbalance. Further, it is useless to balance the rotor by applying artificial ripple magnetic fluxes to the rotor, because the actual slot ripple magnetic fluxes are dependent on the errors in the manufacture or assembly of the stator core and windings and therefore cannot be artificially reproduced on the basis of calculation, thereby making a solution of this problem very difficult.

The present invention has been developed in view of this point and succeeded in achieving a rotary electric machine of this type which obviates the above-mentioned shortcomings and also is realized readily.

Accordingly, it is an object of the present invention to provide a rotary electric machine of this type in which the surface of the retaining ring fitted on each end of the rotor winding is opposed to the inner side wall of the stator core and the slot ripple magnetic fluxes may be great and wherein the retaining rings are not greatly affected by the ripple magnetic fluxes thereby to reduce the deformation of the retaining ring and the resulting vibrations of the rotor.

According to the present invention, there is provided a rotary electric machine comprising a magnetic transmission device provided in the stator core as a portion which is opposed to the coil retaining ring of the rotor for magnetically coupling adjacent core teeth of the stator at the portion which is located in the vicinity of the ends of the core teeth formed between stator winding slots, thereby reducing the effects of the slot magnetic fluxes on the retaining ring to achieve the intended object.

The above and other objects, features and advantages will be made apparent by the detailed description taken in conjunction with the accompanying drawings, in which.

Figure 1:
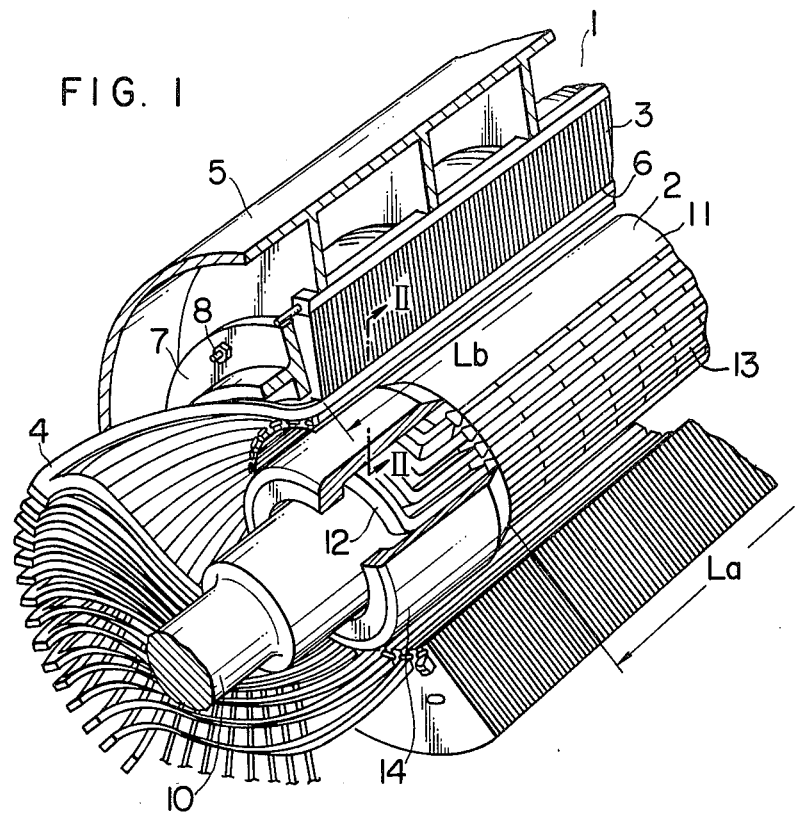
FIG. 1 is a partially cut-away perspective view showing the essential parts of a rotary electric machine according to the present invention.

The present invention will be described below in detail with reference to embodiments shown in the drawings.

Figure 2:
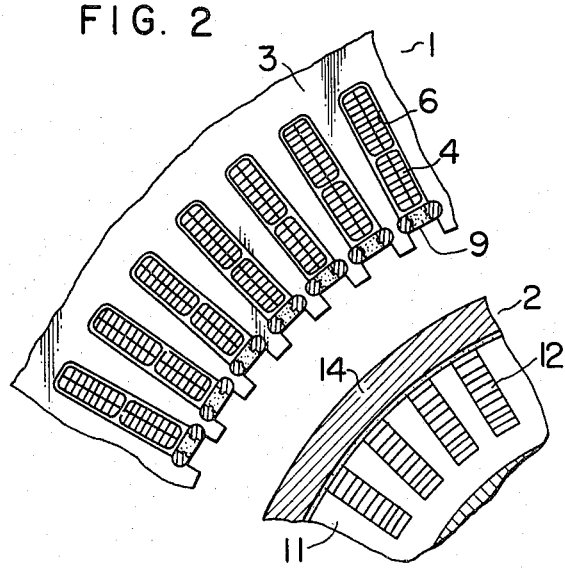
FIG. 2 is a sectional view taken along the line II—II in FIG. 1.

Partial sectional views of a turbine generator having a stator 1 and a rotor 2 are shown in FIGS. 1 and 2. The stator 1 includes a stator core 3 preferably made of laminations of silicon steel sheets, a stator winding 4 and a stator frame 5. The stator core has coil slots 6 axially extending on the inside thereof and is integrally fastened with an end plate 7 by a bolt 8 at each axial end thereof. The stator winding 4 is mounted in the coil slots 6 and held to the stator core 3 by means of wedges 19 made of non-magnetic material, and specific wedges 9 as mentioned hereinafter.

The rotor 2, on the other hand, comprises a rotary shaft 10, a core 11 integrated with the rotary shaft 10, and a rotor winding 12. The rotor winding 12, like the stator winding is mounted and held in coil slots of the core 11 through wedges 13. Coil ends of the winding are axially protruded from the core 11 and held by the retaining ring 14 arranged on the outer periphery thereof. This retaining ring 14 is made of a metallic material to assure mechanical strength and, preferably a non-magnetic material since it is subjected to magnetic fluxes.

Attention must be paid to the fact that as obvious from FIG. 1 the rotor is formed axially shorter than the stator core as described above. In other words, the axial length La of the rotor core 10 is formed shorter than the axial length Lb of the stator core 3. Thus, the core 11 of the rotor is located axially inwards of the stator core 3. As a result, part of the rotor retaining ring 14 is opposed to the inner periphery of the end of the stator core 3.

The wedges 19 are provided to hold the stator winding in the vicinity of the inner periphery of the stator as mentioned above. The wedges of the stator at the part opposed to the retaining ring are formed in the manner described below. In other words, a magnetic transmission device is provided as obvious from the construction of the unit as shown in the perspective view of FIG. 3.

Figure 3:
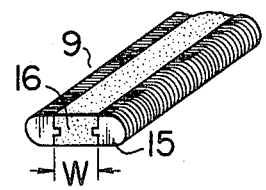
FIG. 3 is a perspective view showing a coil wedge.

The wedge 9 has a laminated iron plate portion 15 on each side thereof integrally fixed to an insulating member 16 at the center. The laminated iron plate portion 15 includes a lamination of iron plates secured to one another by a bonding agent, and the surface thereof is required to be processed sufficiently smoothly to be fitted into the stator core. Although FIG. 3 shows the iron plate portions on both sides in the same shape, what shape they take is not an important factor, so that one may be larger than the other, or the iron plate portion may be provided only on one side. What is important is the width W of the insulating member 16 which is required to be determined carefully since it is a main factor determining the amount of magnetic fluxes flowing therethrough as mentioned in detail hereinafter.

Figure 4:
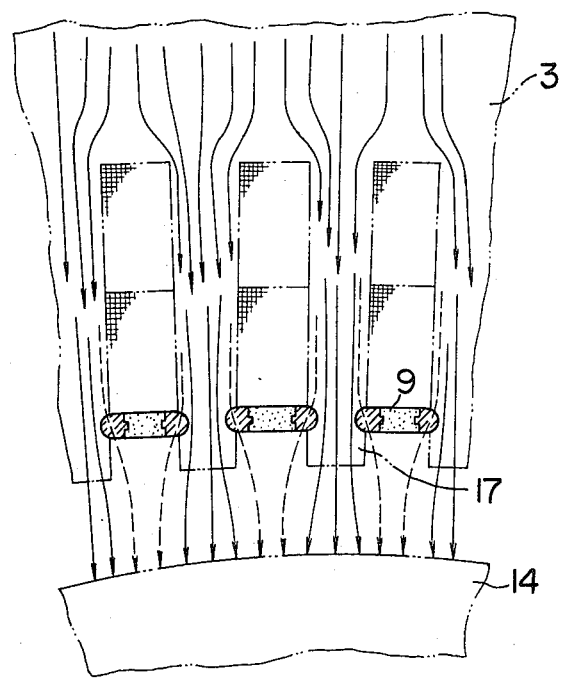
FIG. 4 is a diagram for explaining the motion of the slot ripple magnetic fluxes.

The function of the wedge thus formed and arranged will be explained with reference to FIG. 4. In this figure most of the magnetic fluxes directed from the stator core 3 toward the rotor, i.e., the retaining ring 14 pass through the core teeth 17. Since the wedges 9 formed between adjacent teeth in the vicinity of the ends of the teeth have a large magnetic permeability as mentioned above, part of the magnetic fluxes flows from the teeth 17 toward the rotor through the wedges 9. Thus the amount of magnetic fluxes entering the retaining ring 14 or rotor side directly from the teeth ends is reduced, so that the magnetic fluxes are distributed substantially uniformly on the surface of the retaining ring 14 thereby to prevent the same from local temperature rise, resulting in vibrations being eliminated.

The above-mentioned embodiment is only one example of the arrangement and construction of the wedges according to the present invention and may be replaced by various other modifications.

Figure 5:
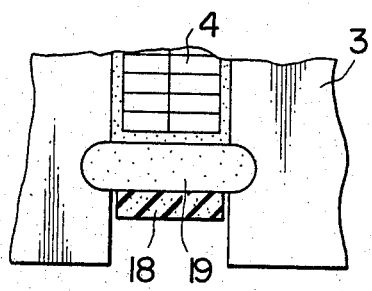
FIGS. 5 and 6 are longitudinal sectional views showing other embodiments of the coil wedge and the surrounding parts thereof.
Figure 6:
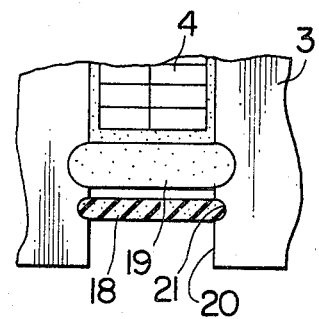

Another embodiment of wedge construction is shown in FIG. 5. In FIG. 5, the shown wedge is made of the same material i.e. non-magnetic material and in the same shape as those of the central wedges 19 of the stator, except that an insulating plate 18 containing iron powder is secured to its surface facing the rotor. In this construction, the wedge for holding the coil remains the same as that of the conventional machine and therefore has the same function and effect as those of the above-mentioned construction not only in mechanical aspects but also in that insertion thereof into the core requires no new type of job. If the insulating plate 18 is formed as thin as possible by increasing the ratio of iron powder or otherwise, the flow of the cooling gas between rotor and stator is not prevented. Also, in the case of a water-cooled rotary electric machine which requires no cooling gas and has suitable room at the ends of the core teeth or, in the case where the space for cooling gas flow is sufficinetly large, wedge slits 21 may be formed in the side wall 20 of the coil slot of the stator core 3 for supporting the insulating plate 18 containing iron powder, as shown in FIG. 6.

Figure 7:
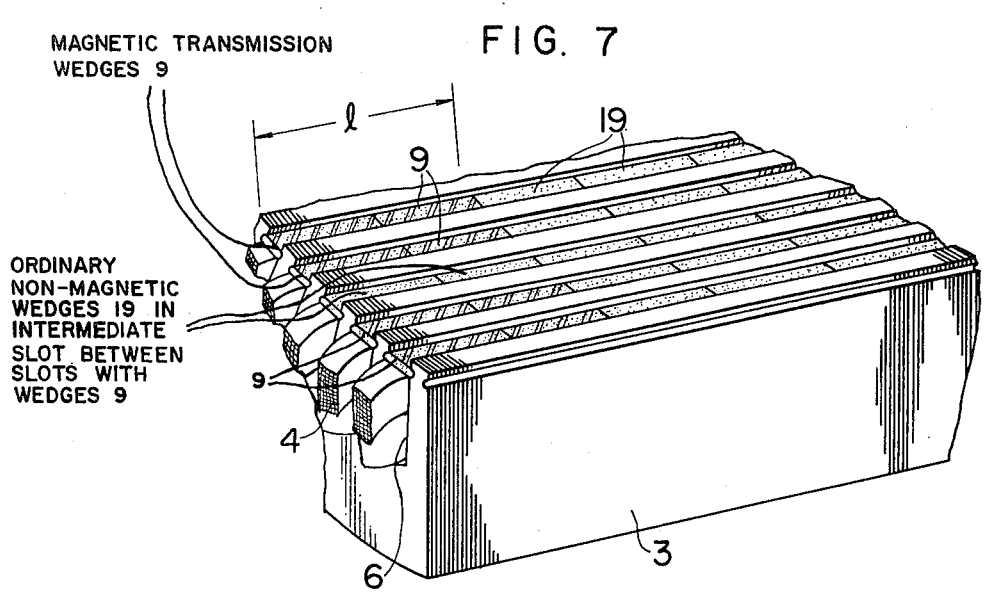
FIG. 7 is a perspective view showing a section of the stator according to another embodiment of the present invention.

Another embodiment involving a modification of wedge arrangement is shown in FIG. 7, which is a perspective view of the inside of the stator. In this embodiment, the wedges 9 as mentioned above are not used for all the slots, but only for selected ones with equally spaced intermediate slots where the ordinary wedges 19 are used. The intervals between the intermediate slots are determined so as to attain the intended effect depending on the design of each rotary electric machine, the machining accuracy, laminated condition of core or assembled condition thereof. One example which gave good test results is shown in FIG. 7 in which every third slot is omitted from application of the specifically designed wedge. This arrangement prevents closed magnetic paths parallely surrounding the outer periphery of the stator core through the wedges, thus reducing the loss in the wedges effectively and practically. In the drawing, character l shows the depth of the edge of the retaining ring 14 from the longitudinal edge of the stator. In the embodiments mentioned above, the specific wedges extend substantially throughout the portions of the slots opposing to the retaining ring of the rotor. Alternatively, however, satisfactory effects may be obtained by providing such wedges at selected portions of the slots which are opposing to those portions of the retaining ring which are liable to be deformed due to local heating and may be determined experimentally.

It is simply explained above that wedges of large magnetic permeability are arranged in the vicinity of the inner periphery of the stator opposed to the retaining ring of the rotary electric machine of this type. In this connection, it should be noted that if the permeability of the wedges is too large, magnetic fluxes flowing through the wedges are too much increased, which in turn increases the leakage reactance of the coil slots, resulting in an increased loss. Therefore, adequate care must be taken in determining the magnetic permeability of the wedges.

Figure 8:
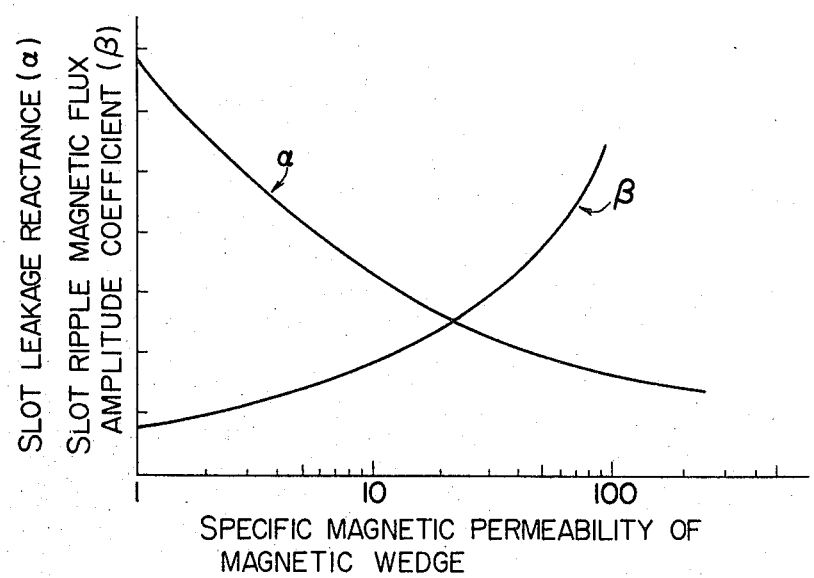
FIG. 8 is a graph showing the characteristics of the slot leakage reactance and the slot ripple flux amplitude with respect to the specific permeability of the magnetic wedge.

The graph of FIG. 8 shows the results of a test conducted using a 700 MW turbine generator to examine the characteristics of the slot leakage reactance and the amplitude coefficient of the slot ripple magnetic fluxes with respect to the permeability of the wedges. As seen from this graph, the slot leakage reactance curve α has a trend opposite to that of the slot ripple magnetic flux amplitude curve β with variation of the wedge permeability. In determining the permeability of the wedges, it is necessary to determine a proper value on one of the two curves. Such a value may vary depending on the characteristics required by the designer or the type of machine involved. Naturally, however, the designer in general has a desire to limit the loss due to reactance to some degree. Various tests conducted taking this fact into consideration show that in the case of 700 MW class turbine generator mentioned above, the most proper specific magnetic permeability is approximately 30.

Figure 9:
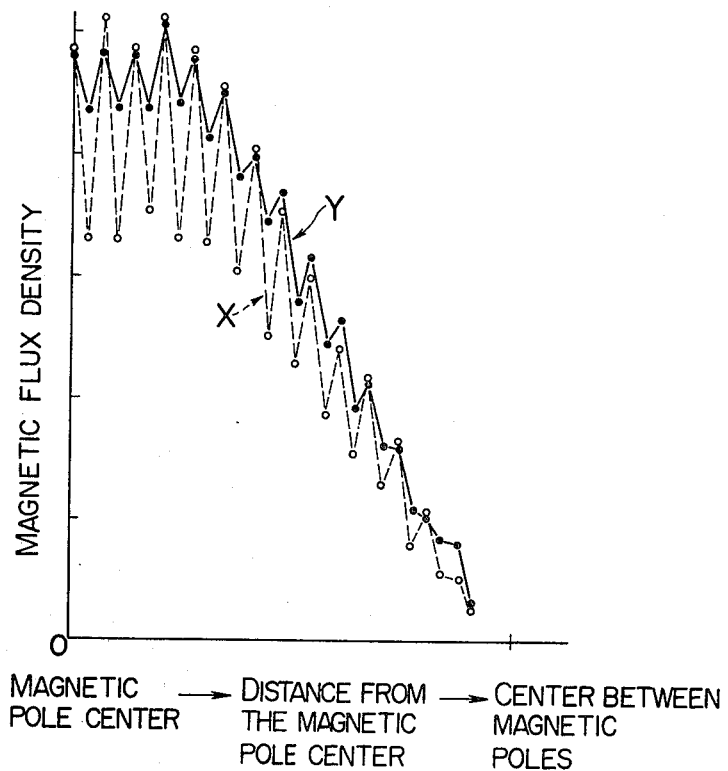
FIG. 9 is a graph showing the relation between the position of the surface of the rotor and the magnetic flux density.

The graph of FIG. 9 is the result involving the above-mentioned value of magnetic permeability. This graph concerns the case in which the density of magnetic fluxes is measured along a circular portion surrounding the outer periphery of the retaining ring. Let us compare the effect on slot ripple in the case of the rotary electric machine according to the present invention with that in the case of a conventional rotary electric machine with reference to this graph. The curve X of dotted line in the drawing is of the conventional rotary electric machine in which the wedges in the stator opposed to the retaining ring are all non-magnetic. It is obvious from the drawing that except at and near the center between magnetic poles, the ripple has generally considerable ups and downs. In the case of the rotary electric machine according to the present invention, by contrast, the solid curve Y shows that the ripple is very small in ups and downs, thus leading to much superior characteristics.

Figure 10:
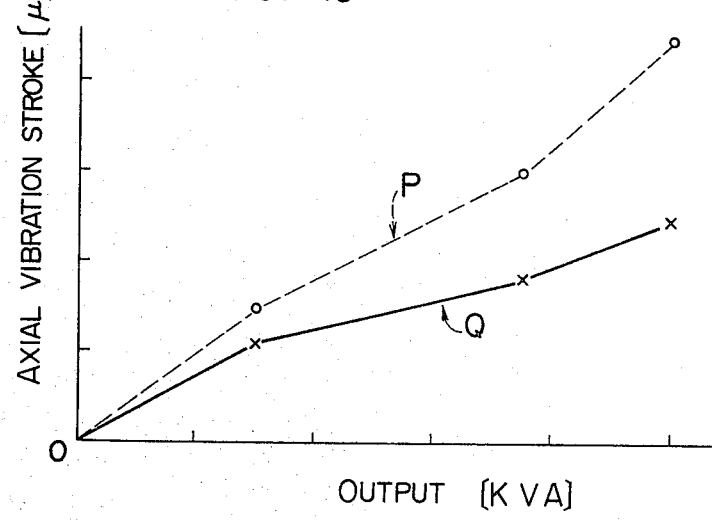
FIG. 10 is a graph showing the relation between the output of the machine and the axial vibrations thereof.

The diagram of FIG. 10 shows the result of a test conducted to determine the effect of the prevention of vibrations which is the main object of the present invention. The curve P of dotted line represents vibration of a conventional rotary electric machine, and the curve Q of solid line represents vibration of the rotary electric machine according to the present invention. Comparison between these curves shows that vibrations are prevented very effectively in the rotary electric machine according to the present invention. Especially it is seen that the effectiveness becomes more conspicuous, as the output is larger.

It will be seen from the foregoing explanation that in the rotary electric machine according to the present invention, those wedges which are disposed at portions opposed to the coil retaining ring of the rotor are made of a magnetic material to allow transmission of magnetic fluxes, and, as a result, the ripple magnetic fluxes produced from the stator core toward the retaining ring are not concentrated in the teeth of the stator core. In other words, the magnetic fluxes from the stator core are distributed on the retaining ring substantially uniformly in density. Thus heat generation by eddy current loss in the retaining ring is greatly eliminated, so that local deformation of the retaining ring and vibrations which otherwise might be caused thereby are fully prevented and also the difference in temperature rise between the rotor core and the retaining ring is reduced, thus making it possible to produce a highly reliable rotary electric machine of this type.

The rotary electric machine with superior characteristics according to the present invention has no bulky construction as compared with the conventional rotary electric machines. The fact that the construction of the rotary electric machine according to the invention is not considerably different from that of the conventional machines makes it unnecessary to add any other complex work or to change the manner of assembly or disassembly.

What we claim is:

1. In a rotary electric machine comprising an annular stator core having a plurality of axially extended core teeth to form coil slots therebetween at regular intervals in the circumferential direction in the inner surface of said annular stator core, a stator winding mounted in said coil slots of said stator core through a predetermined insulating material, a plurality of non-magnetic wedges fitted into said coil slots for securely holding said stator winding in said coil slots, a rotor core mounted in the annular hollow portion of said stator core and formed axially shorter than said stator core, a rotor winding wound on said rotor core and having an end portion protruded axially from said core, a coil retaining ring of an electrically conductive material for securely holding the end portion of said rotor winding and a rotary shaft for holding said rotor core; the improvement further comprising magnetic transmission means for magnetically connecting adjacent teeth of said stator core, said magnetic transmission means being provided in said stator slots only at portions opposed to said coil retaining ring for facilitating transmission of magnetic flux from said stator to said rotor through said portions of said stator slots having said magnetic transmission means.

2. A rotary electric machine according to claim 1, in which said magnetic transmission means are provided to only selected ones of the slots with equally spaced intermediate slots.

3. A rotary electric machine according to claim 1, in which said magnetic transmission means are securely fixed to the wedges holding said stator winding.

4. A rotary electric machine according to claim 1, wherein the magnetic transmission means comprises an insulating material containing magnetic particles for providing magnetic permeability.

5. A rotary electric machine according to claim 4, wherein the wedges comprise first and second end portions with said insulating material located between said end portions.

6. A rotary electric machine according to claim 4, wherein the insulating material comprises a plate adjacent to a side of said wedges of non-magnetic material opposite the side contacting the stator winding so that said insulating material is located between the wedges and the rotor.

7. A rotary electric machine according to claim 6, wherein said insulator plate contacts said wedge.

8. A rotary electric machine according to claim 6, wherein said insulator plate is spaced apart from said wedge.

9. A rotary electric machine according to claim 4, 5, 6, 7 or 8, wherein said magnetic particles in said insulating material comprise iron powder.

* * * * *